Figure 1:
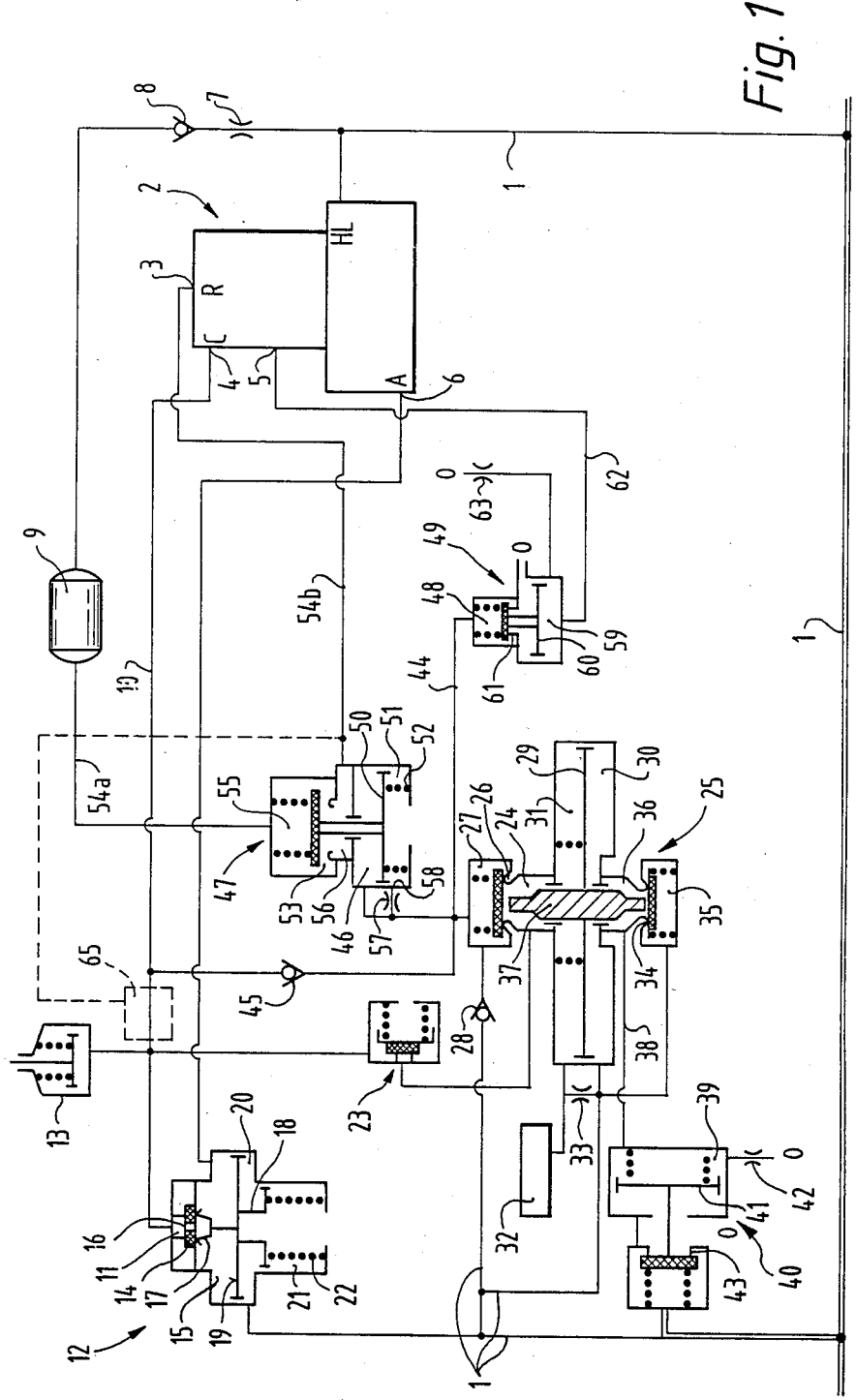

United States Patent [19]

Huber

[11] Patent Number: 4,589,705

[45] Date of Patent: May 20, 1986

[54] RELEASE DEVICE FOR MULTIPLE RELEASE COMPRESSED AIR BRAKES OF RAILBORNE VEHICLES

[75] Inventor: Johann Huber, Munich, Fed. Rep. of Germany

[73] Assignee: Knorr-Bremse AG, Munich, Fed. Rep. of Germany

[21] Appl. No.: 662,095

[22] Filed: Oct. 18, 1984

[30] Foreign Application Priority Data

Oct. 25, 1983 [DE] Fed. Rep. of Germany ....... 3338699

[51] Int. Cl.⁴ ............................................. B60T 15/18
[52] U.S. Cl. ........................................ 303/36; 303/77
[58] Field of Search ........................ 303/36, 67, 75, 77

[56] References Cited

U.S. PATENT DOCUMENTS 2,136,581 11/1938 Campbell ........................ 303/67 X Primary Examiner—Duane A. Reger
Attorney, Agent, or Firm—Edmund M. Jaskiewicz

[57] ABSTRACT

The release device for multiple release compressed air brakes of railborne vehicles comprises a pressure reduction valve (12) which responds in the case of rapid brake applications and optionally of full brake applications, which in order to facilitate the brake release procedure and to accelerate the pressurization of the brake cylinder (13) feeds compressed air from the reference pressure chamber of the triple pressure control valve (2) into the brake cylinder (13). In addition, a sensor valve (25) is provided which, being monitored by an overflow valve (23) which only responds after at least full brake applications having been applied, is adapted to feed brake pressure from the brake cylinder (13) into the main air pipe (1). A feed valve (47) ensures in this context that any air supplementation from the air storage vessel (9) into the brake cylinder (13) through the triple pressure control valve (2) which is still in the brake application position, due to an interruption of that connection, is prevented; such air supplementation facility is not released by the feed valve (47) before the triple control valve 2 has been switched to its released position. The release device facilitates brake release and brake acceleration, in particular in the case of long trains, while saving air.

11 Claims, 2 Drawing Figures

RELEASE DEVICE FOR MULTIPLE RELEASE COMPRESSED AIR BRAKES OF RAILBORNE VEHICLES

The invention relates to a release device for multiple release compressed air brakes of railborne vehicles, comprising a triple pressure control valve which, being controlled by the pressure in a main air pipe in opposition to the pressure in a reference pressure chamber monitors the venting of a brake cylinder optionally by way of a relay valve by way of a brake pressure supply from an air storage vessel as well as the venting of the brake cylinder into the atmosphere by way of a release nozzle of optionally adjustable cross section and comprising a valve device which during at least those release procedures, following rapid brake applications, feeds compressed air into the main air pipe.

Multiple release compressed air brakes of railborne vehicles are controlled by the controlled introduction into the main air pipe of pressure levels corresponding to the respective brake procedures; starting from a particular control pressure level in the main air pipe associated with the released state of the compressed air brakes, pressure drops down to a certain limiting pressure will bring about an actuation of the compressed air brake up to a full brake application, while pressure increases in the main air pipe up to the control pressure level will bring about corresponding brake release procedures. Pressure drops in the main air pipe below the limiting pressure, down to atmospheric pressure will bring about rapid brake applications during which, depending on the design of the brake, the full brake action is retained or even further increased.

Accordingly the multiple release compressed air brakes can only be released in the same ratio as the pressure in the main air pipe is raised. This principle, in contrast to the so-called single release compressed air brakes permits a good braking force regulation as regards brake initiation as well as release procedures. Because raising the pressure in the main air pipe also involves charging the air reservoir, the multiple release compressed air brakes are considered inexhaustible. Charging of the air reservoir requires an amount of air which has to be conveyed through the main air pipe. This impedes the brake release in particular when trains are long and more so if the brakes have to be released after a full or rapid brake application. In the case of single release compressed air brakes—which, however, are exhaustible—such difficulties do not arise, because after the introduction of a release procedure, a complete release of such compressed air brakes takes place automatically.

The largest differences in braking pressure and thereby brake action over the length of a train result when the brakes are released after a rapid brake application. In that procedure the main air pipe pressure must first be raised to the aforesaid limiting pressure and brake release will only commence after further pressure increases and will proceed in accordance with the pressure increases in the main air pipe. In the case of multiple release compressed air brakes this may mean that the first carriages of a train have already had their brakes released, while the brakes of the last carriage may just commence the brake release procedure. If such a release procedure takes place on a slope, it is quite possible for the train to start moving, even though the wheels of the last vehicle of the train are still locked and accordingly cannot turn; flat spots may form and even inadvertent train separations may occur. Release devices are already known for overcoming such release problems which are intended to accelerate and therey render more uniform the release procedure of a train equipped with mulitiple release compressed air brakes:

From German Accepted Specification 11 45 212 a release apparatus of the type set out in the introduction is known, wherein the valve device for operating its valves comprises piston members subjected to the brake pressure, spring forces and an auxiliary pressure and non-return valves, and which during the release procedure feeds compressed air from the control pressure chamber into the main air pipe, thereby on the one hand to lower the control pressure level in the control pressure chamber so as to establish in the triple pressure control valve a full release situation even whilst the main air pipe pressure is still below the control pressure level, and on the other hand, by feeding compressed air into the main air pipe, to accelerate the pressure rise in the latter and thereby the release procedure. However, in that known release device a renewed brake initiation during the course of the release acceleration, i.e. the feeding of compressed air from the control pressure chamber into the main air pipe, may results in an undesired degree of pressure drop in the control pressure chamber and thus in exhaustion-like conditions of the compressed air brake.

Similar problems may arise with a release device according to German Patent Specification 11 31 722, similarly intended for multiple release compressed air brakes, in which during the release procedure compressed air is released to the atmosphere from the control pressure chamber instead of being fed into the main air pipe.

For single release compressed air brakes it is known for example from German Patent Specification 20 29 408 to connect during release procedures a space holding brake pressure to the main air pipe such that the brake pressure can be vented into the main air pipe, thereby accelerating the pressure rise in the latter. However, it is not possible to apply these devices to multiple release compressed air brakes.

It is an object of the invention to provide a release device as set out in the introduction for multiple release compressed air brakes capable of facilitating or accelerating the release procedures effectively and avoiding the shortcomings of the known release devices, in particular, avoiding any risk of exhaustion. In addition, it is intended that the release device should also be so adaptable that it can subsequently be fitted to existing multiple release compressed brake installations and/or can be combined advantageously with certain parts of the compressed air brakes.

This object is attained in accordance with the invention in that the valve device during the release procedures not only—in a manner known per se—opens a communication from a space in which brake pressure prevails to the main air pipe until the brake pressure level has dropped below a limiting value, but also blocks the air storage vessel off the space in which brake pressure prevails until such time as the triple pressure control valve is changed over from its brake position into the release position.

It is possible for a release device so designed to be further adapted in an advantageous manner according to the features of the subsidiary claims.

Figure 2:
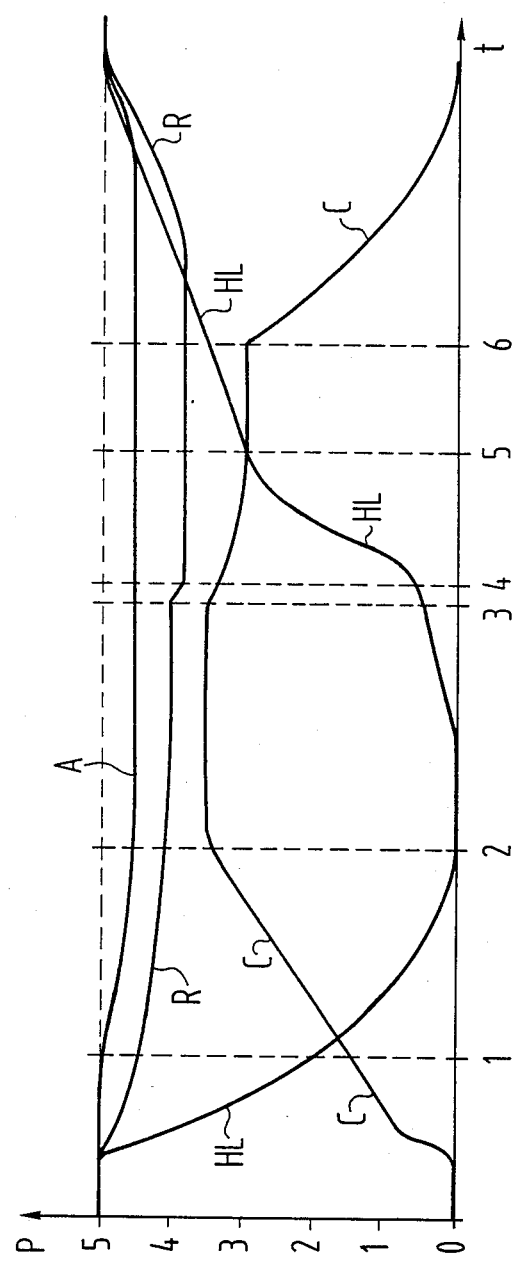

In the drawing a working example of a release device designed according to the invention is illustrated, there being shown in FIG. 1, the layout of the release device in a diagrammatic manner and FIG. 2, certain pressure patterns which illustrate the mode of function of the release device.

According to FIG. 1, a main air pipe 1 is connected to a triple pressure control valve 1, shown diagrammatically in elevation, the design and function of which may correspond for example to that of the already mentioned German Patent Specification 11 31 722 or that of German Patent Specification 919 234, therefore requiring no further explanation. In addition to its connection HL to the main air pipe, the triple pressure control valve 2 comprises a connection 3 for its supply with compressed air from an air reservoir 9, a connection 4 for issuing a brake pressure, a venting connection 5 and a connection 6, communicating with its control pressure chamber. In addition, the air reservoir 9 is connected to the main air pipe 1 by way of a charging device illustrated in the form of a nozzle 7 and a non-return valve 8.

The brake pressure connection 4 of the triple pressure control valve 2 communicates by way of a pipe 10 with a space 11 of a pressure reduction valve 12 and a brake cylinder 13. The space 11 is separated from a space 15 by way of a partition of the casing comprising fixed to the casing the valve seal 14, a nozzle 16 passing through the valve seal 14. A space 15 accommodates a valve disc 17 which when bearing against the valve seal 14 is adapted to seal off the outlet of the nozzle 16. The valve disc 17 is connected to a differential piston 18, the larger piston area 19 of which limits the space 15, the annular area of which is subjectable to pressure from a space 20, the annular area being smaller than the piston area 19, and the space 20 being connected to the main air pipe 1, and the small area of which borders a space 21 in communication with the atmosphere and accommodating a spring 22 biasing the differential piston 18 in the direction of displacement towards the space 15 and in the direction in which the valve disc 17 engages the valve seal 14. Also connected to the pipe 10 is the inlet of an overflow valve 23 which opens on attainment in the pipe 10 of a pressure corresponding approximately to full brake conditions and which closes again when the pressure drops slightly below its opening pressure. The outlet of the overflow valve 23 communicates with a space 24 of a sensor valve 25. The space 24, by way of a release acceleration valve 26 is separated from a space 27 connected to the main air pipe 1. by way of a non-return valve 28, opening in that direction of flow, The release acceleration valve 26 which is spring-loaded in the closing direction is adapted to be operated by a piston 29 which in the opening direction of the release acceleration valve 26 is pressurised by the main air pipe pressure in a chamber 30 communicating with the main air pipe 1 and on its opposite side by the reference pressure in reference pressure chamber 31. The reference pressure chamber, the volume of which is increased by a vessel 32 communicates with the chamber 30 by way of a nozzle 33. In addition the sensor valve 25 comprises a stop valve 34, similarly adapted to be operated by the piston 29, being spring-loaded in the direction of closing and monitoring the passage from a space 35 in communication with the main air pipe to a space 36. The release acceleration valve 26 and the closure valve 34 are provided on opposite sides of the piston 29 and are adapted to be opened by way of a valve tappet 37 connected to the piston 29; the accelerating valve 26 and the closure valve 34 are closed in the intermediate position of the piston 29, whilst whenever the piston 29 is displaced in the one or other direction, respectively one of the two valves, namely either the release acceleration valve 26 or the stop valve 34, is opened.

A pipe 38 passes from the space 36 of the sensor valve 25 to the piston chamber 39, forming part of an accelerator 40 and being limited by a piston 41 and connected permanently to the atmosphere by way of a nozzle 42. When subjected to pressure, the piston 41 opens an acceleration valve 43 spring-loaded in the closing direction and accommodated in a connection of large cross section from the main air pipe 1 to the atmosphere.

A pipe 44 connected to the pipe 10 by way of a non-return valve 45 which opens in the direction of flow towards the pipe 44 leading to a piston chamber 46 of a feed valve 47 and parallel thereto into a space 48 of a pressure build-up valve 49, is connected to the space 27. The piston chamber 46 is separated by a piston 50 from a space 51 in permanent communication with the atmosphere and accommodating a spring 52 which biases the piston 50. The spring 52 biases the piston 50 in opposition to the pressure in the piston chamber 46 in the opening direction of a stop valve 53 adapted to be operated by the piston 50 and provided in a feed line 54a, 54b, subdividing the latter into two feed line sections 54a, 54b. The feed line section 54a connects the air reservoir 9 to a space 55 of the feed valve 47, preceding the stop valve 53, and the feed line section 54b leads from a space 56 of the feed valve 47 on the opposite side of the stop valve 53 to a connection 3 for the compressed air supply of the triple pressure control valve 2. In addition the pipe 44 is connected by way of a nozzle 57 to a vent aperture 58 provided in the path of movement of the piston 50 and entering into the space 51 while the feed valve 47 is in the position of rest with the stop valve 53 open, while being passed thereover by the piston 50 when pressurised by way of the piston chamber 46 and the stop valve 53 is closed, when the aperture will be either blocked or enter into the piston chamber 46.

The pressure build-up valve 49 comprises a piston 60, limiting a chamber 59 and which when the chamber 59 is pressurised, opens a venting valve 61 which connects the space 48 to the atmosphere. The chamber 59 is connected by way of a pipe 62 to the venting connection 5 and by way of a release valve 63 associated with the triple pressure control valve 2 permanently to the atmosphere. The release valve 63 may be operable in a known manner which is not illustrated such that the release performance of the triple control valve 2 can be adapted to whatever type of train is involved by the introduction of a cross section of the release nozzle 63 suitable for the particular case.

When the compressed air brake is released and ready to operate, its components assume the positions apparent from FIG. 1, the main air pipe 1 and the air reservoir 9 are charged to control pressure level, the brake cylinder 13 is vented via pipe 10 through the triple pressure control valve 2 in its release position, the pipe 62 and the release nozzle 63. The spring 52 by way of the piston 50 holds open the stop valve 53 such that compressed air is available at the connection 3 of the triple pressure control valve 2; in this state the venting aperture 58 leads through the space 51 into the atmosphere, such that the pipe 44 and the piston chamber 46 are pressureless. The spring 22 jointly with the main air pipe pressure prevailing in the space 20, against the pressurisation prevaiing in the space 15 derived from the control pressure chamber of the triple pressure chamber control valve 2 and corresponding to the control pressure level, holds the valve disc 17 in abutment against the valve seal 14 such that the nozzle 16 is closed and the connection 6 of the triple pressure control valve 2 is separated off the pipe 10. On both sides of the piston 29 of the sensor valve 25 control pressure level prevails, the piston 29 is accordingly kept in its intermediate position and the release acceleration valve 26 as well as the stop valve 34 are closed. The piston chamber 39 is vented by way of the nozzle 42 and the acceleration valve 43 is closed. The overflow valve 23 is closed as is the venting valve 61.

During those brake and release procedures which are to be considered operational brake applications and wherein full brake applications are not attained, the triple pressure control valve 2 operates in accordance with the pressure introduction into the main air pipe 1—pressure reductions below the control pressure level and subsequent pressure increases—in the conventional manner, with a separation of the brake cylinder 13 from the venting nozzle 63 during a brake initiation procedure, compressed air being introduced into the brake cylinder from the air reservoir 9 by way of the opened stop valve 53, whereas this compressed air application is blocked off during release procedures, when the brake cylinder 13 is connected to the atmosphere by way of the release nozzle 53. During such release procedures, a pressure build-up occurs against the release nozzle 63, causing the piston 60 to be raised for a period in order to open the venting valve 61; after the pressure build-up has been released through the release nozzle 63, the venting valve 61 is closed once again. All other valve devices illustrated in FIG. 1 remain in their illustrated operating positions, in particular it must be stressed, that even the stop valve formed by the valve disc 17 and the valve seal 14 remains closed. The pressure in the reference pressure chamber 31 is able to adapt through the nozzle 33 so rapidly to the prevailing main air pipe pressure during such brake and release procedures that the piston 29 remains at rest.

When initiating a full brake application, the pressure in the main air pipe 1 is lowered down to a limiting pressure level and the triple pressure control valve 2 feeds a correspondingly high full brake application pressure into the pipe 10 and the brake cylinder 13. This full brake pressure suffices for the opening of the overflow valve 23; in other respects, however, the brake and release procedures proceed as described in the aforegoing, the overflow valve 23 being closed once again.

In order to initiate a rapid brake application, the pressure in the main air pipe 1 is lowered rapidly down to a very low pressure level which in any event is below the limiting pressure level and may correspond virtually to atmospheric pressure. In the course thereof the triple pressure control valve 2 sets up in the brake cylinder 13 in the previously described manner the full brake application pressure level or a pressure level which is even higher by a predetermined amount such that the overflow valve 23 opens. Simultaneously the main air pipe 1 as well as the chamber 30 are rapidly vented, the pressure in the reference pressure chamber 31 cannot drop by way of the nozzle 33 at the same rapid rate and presses the piston 29 downwardly to open the stop valve 34. The main air pipe pressure prevailing in the space 35 passes through the pipe 38 into the piston chamber 39, pressurises the piston 41 and thus brings about the opening of the acceleration valve 43 which opens a connection of large cross section from the main air pipe 1 to the atmosphere, thereby to accelerate the pressure drop in the main air pipe 1. After substantial lowering of the pressure in the main air pipe 1, the pressure prevailing in the reference pressure chamber 31 is enabled to equilibrate by way of the nozzle 33 with the main air pipe pressure which is now at a low level, and accordingly the spring-loading causes the piston 29 to be raised again and the stop valve 34 to be closed. The pressure prevailing in the piston chamber 39 is released by way of the nozzle 42 to the atmosphere and the acceleration valve 43 subsequently closes again due to its spring-loading. While these procedures take place, the pressure in the main air pipe 1 being below the limiting value, the pressure prevailing in the space 15 derived from the control pressure chamber of the triple pressure control valve 2 permits movement of the differential piston 18 against the loading by the spring 22 and the residual pressure of the main air pipe exercised there against to move downwardly, the valve disc 17 being raised off the valve seal 14 and the stop valve 14, 17 thus being opened. From the control pressure chamber of the triple pressure control valve 2, compressed air may thus be discharged through the nozzle 16 to the brake cylinder 13 in order to accelerate the pressure build-up in the brake cylinder 13. In the control pressure chamber of the triple pressure control valve 2 and the space 15 a limited pressure drop takes place at the same time which is limited on the one hand by the pressurisation of the brake cylinder 13 rising to the maximum pressure of the latter and on the other hand, when the main air pipe is emptied completely, by the pretensioning of the spring 22 which is able to lift the differential piston 18 after a corresponding pressure drop in the space 15 against the pressurisation of the piston area 19 and to once again place the valve disc 17 against the valve seal 14. The pressure drop in the control pressure chamber of the triple pressure control valve 2 is thereby in any event stopped and terminated at a pressure level which is still above the limiting pressure level in the main air pipe.

During the brake release following a rapid brake application, the pressure in the main air pipe 1 is increased initially relatively fast until the limiting pressure has been attained; in the course thereof the triple pressure control valve 2 remains in its brake position. During this pressure increase the piston 29 of the sensor valve 25 is raised so that the release acceleration valve 26 is opened and compressed air enters the main air pipe 1 from the brake cylinder 13 to the opened overflow valve 3, the opened release acceleration valve 26 and the non-return valve 28 which is caused to open, and the pressure increase in the main air pipe is accelerated. At the same time, jointly with the space 27 the pipe 44 which until then has been permanently vented, and as a result the piston chambers 46 are supplied with compressed air, the piston 50 is pressed downwardly against the force of the spring 52 and the stop valve 53 is closed. Accordingly the air reservoir 9 is blocked off the connection 3 for the compressed air supply of the triple pressure control valve 2 and the triple pressure control valve 2, in spite of its brake position, is no longer able to feed further compressed air to the brake cylinder 13. In combination with the aforedescribed limiting of the pressure drop in the control pressure chamber, this closing off of the stop valve 53 eliminates a risk of exhaustion of the compressed air brake.

Due to the compressed air introduction from the brake cylinder 13, the pressure level in the main air pipe 1 rises rapidly to approximately the limiting pressure, there being attained at least approximately a pressure equilisation between the brake cylinder pressure and the main air pipe pressure. The brake cylinder pressure during that procedure drops slightly below the maximum full brake pressure and the overflow valve 23 is closed approximately on attainment of the equilibrium pressure. It is important that while these procedures take place, it is possible at all times for a rapid brake application to be initiated once again, the compressed air brake due to the almost maximum pressurisation of the brake cylinder 13 still beig fully functionable. During these procedures an excess of pressure is left in the pipe 44 and the piston chamber 46 while the piston has passed over the vent aperture 58, whereby the stop valve 53 is kept closed. As soon as a pressure level has been attained in the main air pipe which is still slightly below the limiting pressure, the triple pressure control valve due to the reduced pressurisation of its control pressure chamber, is changed over into the released position and begins to cause venting of the brake cylinder 13 by way of the release nozzle 63. At the same time a pressure build-up occurs in the chamber 59 which by way of the piston 60 opens the venting valve 61 and brings about a venting of the pipe 44 and of the piston chamber 46 down to atmospheric pressure. In this context the non-return valve 28 prevents a repressurisation of the pipe 44 from the main air pipe, and the non-return valve 45 prevents a repressurisation from the brake cylinder 13. Because the overflow valve 23 is already closed, a recharging of the pipe 44 by these routes is prevented even whilst the release acceleration valve 26 is open. Accordingly, the spring 52 lifts the piston 50 and opens the stop valve 53 such that the air reservoir 9 is again connected to the connection 3 of the triple pressure control valve. If now a brake application is once again initiated, the triple pressure control valve 2 is enabled to once again feed into the brake clylinder 13 a pressure build-up, the compressed air brake is fully functionable. At the end of the release procedure, approximately on attaining the control pressure level in the main air pipe 1, the pressure in the chamber 30 and the reference chamber 31 of the sensor valve 25 become equilibrated, the release acceleration valve 26 closes due to its spring bias and the piston 29 returns to its intermediate position. Shortly prior to the termination of the venting of the brake cylinder 13, the pressure build-up prevailing in the chamber 59 drops such that the venting valve 61 is closed again. Thereafter the brake cylinder 13 is discharged completely by way of the release valve 63. On opening the stop valve 53, the venting aperture 58 is once again released as well such that the pipe 44 and the piston chamber 46 are connected to the atmosphere by way of a nozzle 57, possible residual pressures may thus be vented from the piston chamber 46 to the atmosphere. Even in the event of leaks of the non-return valve 45 or of the release acceleration valve 26, it is not possible for a pressure build-up in the pipe 44 and the piston chamber 46 to occur inadvertently, the air entering by way of such leaks would instead be released immediately to the atmosphere by way of the nozzle 57 and in appropriate situations also through the non-return valve 45, and accordingly an inadvertent closure of the stop valve 53 cannot occur.

From FIG. 2 in which pressure patterns P over the time t are plotted, the mode of functioning of the release device is similarly clearly apparent. In this context, the pressure prevailing in the main air pipe 1 is denoted as HL, the pressure prevailing in the brake cylinder as C, the pressure in the air reservoir as R and the pressure in the control pressure chamber as A. In the released position of the compressed air brake, the pressure in the brake cylinder amounts to 0 bar, all other pressures are equal to the control pressure level of for example 5 bar. For braking the main air pipe pressure is lowered, the brake pressure accordingly rises and due to the compressed air portion consumed for building up the brake pressure, the pressure in the air reservoir drops slightly. In the event of a rapid brake application, the main air pipe pressure HL drops below the limiting pressure and at the instant 1 the pressure reduction valve 12 opens the stop valve 14, 17 such that the pressure A in the control pressure chamber as well begins to drop. At the instant 2 the main air pipe pressure HL has dropped approximately to atmospheric pressure and the brake pressure C very soon thereafter attains its maximum pressure level. During subsequent brake release, the main air pipe pressure HL rises until at the instance 3 the stop valve 26 of the sensor valve 25 is opened and feeds brake pressure C from the brake cylinder into the main air pipe, accordingly the main air pipe pressure rises very rapidly until approximate equilibrium with the slightly dropping brake pressure C is attained. At the start of this procedure the stop valve 53 is still opened for a very brief period, as a result of which a small amount of air is able to escape also from the air reservoir 9 through the triple pressure control valve 3 and the pipe 10 to the main air pipe such that in the air reservoir 9 at the instant 4 a negligibly small pressure drop is brought about.

After the attainment of the pressure equilibrium between the brake pressure C and the main air pipe pressure HL at the instant 5 the main air pipe pressure HL continues to rise slowly, while the brake pressure for a short while remains approximately constant until the triple pressure control valve 2 at the instant 6 changes into its release position and causes the brake pressure C to be vented to the atmosphere by way of the release nozzle 63. Thereafter the main air pipe pressure HL increases and, with a slight time delay in relation thereto the pressure R in the air reservoir and the pressure A in the control pressure chamber also rise up to the control pressure level. Thus, the full release condition is reattained.

Accordingly the release device comprising the pressure lowering valve 12, the sensor valve 25, the overflow valve 23, the feed valve 47 and the pressure build-up valve 49 effects a facilitated brake release which on the one hand due to the lowering of the pressure in the control pressure chamber of the triple pressure control valve 2 facilitates the changing thereof into the release position, and which on the other hand by the introduction of compressed air into the main air pipe accelerates the pressure build-up in the latter, which facilitates the release procedure at the end of the train, in particular in the case of long trains.

If the pressurisation of the brake cylinder 13 is not to be controlled directly by the triple pressure control valve 2, but indirectly by way of a relay valve, it is advantageous to install the relay valve 65 in the pipe 10 as shown in broken lines in FIG. 1 in such a manner that the non-return valve 45 follows onto the section between the triple pressure control valve 2 and the relay valve 65 and the overflow valve 23 as well as the pressure lowering valve 12 are connected to the section of the pipe 10 on the other side, connected to the brake cylinder 13. In this context the pressure supply of the relay valve 65 may proceed from the air reservoir 9, following onto the feed valve 47 through a branch pipe leading from the feed pipe section 54b.

By appropriate setting of the pretensioning of the spring 22 of the pressure lowering valve 12, the pressure drop in the main air pipe required for the pressure lowering valve 12 to respond can be adjusted; it may be advantageous to let this pressure lowering valve 12 respond even at pressure drops in the main air pipe 1 reaching up to the limiting pressure, i.e. corresponding to full brake applications, such that even in the event of release procedures following full brake applications, facilitations of the brake release result due to a reduced pressure in the control pressure chamber of the triple pressure control valve 2. By making the nozzle 33 smaller, the response sensitivity of the sensor valve 25 can be increased such that it responds already after full brake applications even at pressure increases in the main air pipe 1 which indicate the initiation of the brake release; by an appropriate setting of the overflow valve 23 to a pressure level below the full brake pressure it is possible to facilitate release procedures after full brake applications by the introduction of compressed air from the brake cylinder 13 into the main air pipe 1 provided the full brake application pressure exceeds the limiting pressure in the main air pipe by an adequate amount.

As previously stated, the non-return valve 28 prevents in any event a discharge of compressed air from the main air pipe 1 to the pipe 44 and by way of the release acceleration valve 26, if opened, to the overflow valve 23, whilst the non-return valve 45 on the one hand prevents a pressurisation of the pipe 44 from the pipe 10 and on the other hand, while the brakes are released, ensures that in addition to the venting aperture 48, a venting of the pipe 44 to the pipe 10 and thus a keeping open of the stop valve 53 is provided for.

As a modification of the abovementioned working examples, it is also possible to connect the air reservoir 9 directly to the connection 3 of the triple pressure control valve and to install the stop valve 53 in the pipe 10, i.e. following onto instead of preceding the triple pressure control valve 2. An important feature of the release device is considered to reside in the fact that in order to attain an acceleration of the release or charging procedure after brake procedures, means are provided which temporarily separate the triple pressure control valve 2 from the air reservoir 9 and which terminate this separation again once the triple pressure control valve itself has adopted its released position and thereby itself brings about the aforesaid separation. Due to the utilisation of compressed air derived from the control pressure chamber of the triple pressure control valve 2 for charging the brake cylinder 13 during brake initiation procedures and of the brake pressure for recharging the main air pipe 1 during release procedures, a low compressed air and concomitant energy consumption results for the compressed air brake in addition to the control procedures being accelerated.

The release apparatus may readily be designed as an independent apparatus or set of apparatus and may be employed with extremely minor changes in existing brake installations. Accordingly the release device is particularly well suited for the subsequent installation into existing compressed air brake installations.

BRIEF DESCRIPTION

The release device for multiple release compressed air brakes of railborne vehicles comprises a pressure reduction valve 12 which responds in the case of rapid brake applications and optionally of full brake applications, which in order to facilitate the brake release procedure and to accelerate the pressurisation of the brake cylinder 13 feeds compressed air from the reference pressure chamber of the triple pressure control valve 2 into the brake cylinder 13. In addition, a sensor valve 25 is provided which, being monitored by an overflow valve 23 which only responds after at least full brake applications have been applied, is adapted to feed brake pressure from the brake cylinder 13 into the main air pipe 1. A feed valve 47 ensures in this context that any air supplementation from the air storage vessel 9 into the brake cylinder 13 through the triple pressure control valve 2 which is still in the brake application position, due to an interruption of that connection, is obviated; such supplementation facility is not released by the feed valve 47 before the triple control valve 2 has been switched to its released position.

The release device facilitates brake release and brake acceleration, in particular in the case of long trains, while saving air.

I claim:

1. In a release device for multiple release compressed air brakes of rail vehicles, a main air pipe (1), an air reservoir (9) and a reference pressure chamber (31) connected to said main air pipe, a triple pressure control valve (2) having a control chamber and brake and release positions connected to said main air pipe and said air reservoir, a brake cylinder (13) connected to said triple pressure control valve such that the triple pressure control valve is controlled by the pressure in the main air pipe in opposition to the pressure in the reference pressure chamber to monitor the supply of brake pressure air to said brake cylinder from said air reservoir, a first release nozzle (63) having a selectively variable cross section and connected to said brake cylinder and said triple pressure control valve to vent said brake cylinder to the atmosphere in response to said triple pressure control valve, valve means (23, 26) connected to said brake cylinder and to said main air pipe for supplying compressed air into the main air pipe during brake release following rapid or full brake application, and a first stop valve (53) connected to said valve means to be actuated thereby and connected between said air reservoir and said triple pressure control valve to block said air reservoir from the brake pressure in said brake cylinder during said brake release until said triple pressure control valve is changed from its brake position into the release position.

2. In a release device as claimed in claim 1 wherein said valve means comprises an overflow valve (23) which opens only on attainment of a brake pressure level corresponding at least to a full brake application, and a release acceleration valve (26) in series with said overflow valve, said release acceleration valve having a first piston (29) urged in an opening direction by the main air pipe pressure in opposition to pressure in said reference chamber.

3. In a release device as claimed in claim 2 and further comprising a first check valve (28) connected between said release acceleration valve (26) and said main air pipe (1) and opening in the flow direction toward said main air pipe, said first stop valve (53) connected to a second piston 50 and having a first spring (52) acting against said second piston to bias said first stop valve (53) in an opening direction, and a first piston chamber (46) defined by said second piston and connected to a portion of a connection between said release acceleration valve (26) and said first check valve (28) such that said first stop valve (53) is closed when said first piston chamber (46) is pressurized.

4. In a release device as claimed in claim 3 wherein said first piston chamber (46) is connected to said brake cylinder pressure and a second check valve (45) is between said first piston chamber and said brake cylinder pressure and opening to the flow direction toward said first piston chamber.

5. In a release device as claimed in claim 4, and further comprising a vent including a second release nozzle (57) leading from said first piston chamber (46), and means connected to said first stop valve (53) and operable substantially simultaneously therewith for closing said vent means when said first stop valve closes.

6. In a release device as claimed in claim 5 wherein said vent comprises a vent aperture (58), said vent closing means comprising said second piston (50) which is movable over said vent aperture.

7. In a release device as claimed in claim 3 and further comprising a venting valve (61) adapted to be connected to the atmosphere and connected to said first piston chamber (46), said venting valve having said first release nozzle (63) and a third piston (60) which in its opening direction is pressurized by a pressure build-up against said first release nozzle to vent said first piston chamber (46).

8. In a release device as claimed in claim 1 and further comprising a second closure valve (14,17) and a third nozzle (16) connected between said control pressure chamber of said triple pressure control valve so as to be subjected to the pressure in said reference pressure chamber (31) and brake pressure in said brake cylinder (13), said second closure valve having a fourth piston (18) urged in a closing direction by the pressure in the main air pipe and a second spring (22) against the pressure in a chamber (15) connected to the control pressure chamber of said triple pressure control valve.

9. In a release device as claimed in claim 8 wherein said fourth piston (18) comprises a differential piston having a larger surface area (19) subjected to the pressure in said reference pressure chamber through said control pressure chamber of said triple pressure control valve and a smaller surface area subjected to the pressure in said main air pipe.

10. In a release device as claimed in claim 2 and further comprising a second stop valve (34) actuated by said first piston (29) to an open position when the pressure in said reference pressure chamber is greater than the pressure in said main air pipe, said second stop valve having one side connected to said main air pipe and another side, an accelerator (40) having a second piston chamber (39) connected to the other side of said second stop valve, a fifth piston (41) in said second piston chamber (39) and subjected to main air pipe pressure when said second stop valve is open, and an accelerator valve (43) actuable by said fifth piston and urged into a closed position by a spring, said accelerator valve opened by said fifth piston to connect the main air pipe to the atmosphere.

11. In a release device as claimed in claim 2 and further comprising a fourth nozzle (33) in the connection between said main air pipe (1) and said reference pressure chamber (31).

* * * * *